United States Patent
Lothspeich et al.

(10) Patent No.: US 11,588,845 B2
(45) Date of Patent: Feb. 21, 2023

(54) METHOD FOR MANAGING A MEMORY

(71) Applicant: Robert Bosch GmbH, Stuttgart (DE)

(72) Inventors: Timo Lothspeich, Weissach (DE); Michael Buchalik, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 416 days.

(21) Appl. No.: 16/695,418

(22) Filed: Nov. 26, 2019

(65) Prior Publication Data

US 2020/0186564 A1    Jun. 11, 2020

(30) Foreign Application Priority Data

Dec. 10, 2018   (DE) .......................... 102018221349.6

(51) Int. Cl.
| | |
|---|---|
| *H04L 29/06* | (2006.01) |
| *H04L 9/40* | (2022.01) |
| *H04L 67/12* | (2022.01) |
| *B60R 16/023* | (2006.01) |
| *G07C 5/00* | (2006.01) |

(52) U.S. Cl.
CPC ........ *H04L 63/1441* (2013.01); *B60R 16/023* (2013.01); *H04L 63/02* (2013.01); *H04L 67/12* (2013.01); *G07C 5/008* (2013.01)

(58) Field of Classification Search
CPC ..... H04L 63/1441; H04L 63/02; G07C 5/008; B60R 16/023
USPC .......................................................... 726/23
See application file for complete search history.

(56) References Cited

U.S. PATENT DOCUMENTS

| | | | | |
|---|---|---|---|---|
| 9,652,257 | B2* | 5/2017 | Preston | G06F 11/2046 |
| 2002/0152304 | A1* | 10/2002 | Collazo | H04L 41/042 |
| | | | | 709/224 |
| 2004/0044778 | A1* | 3/2004 | Alkhatib | H04L 61/2567 |
| | | | | 709/228 |
| 2011/0219035 | A1* | 9/2011 | Korsunsky | G06F 21/00 |
| | | | | 707/E17.005 |
| 2012/0092996 | A1* | 4/2012 | Lautenschlaeger | H04L 47/10 |
| | | | | 370/235 |
| 2013/0322444 | A1* | 12/2013 | Ossipov | H04L 45/245 |
| | | | | 370/392 |
| 2013/0336199 | A1* | 12/2013 | Schwartz | H04W 28/0268 |
| | | | | 370/315 |
| 2014/0192708 | A1* | 7/2014 | Wise | H04B 7/18513 |
| | | | | 370/316 |
| 2014/0195609 | A1* | 7/2014 | Wise | G06V 40/172 |
| | | | | 709/204 |
| 2014/0310483 | A1* | 10/2014 | Bennett | G06F 3/0619 |
| | | | | 711/154 |
| 2015/0092549 | A1* | 4/2015 | Anand | H04L 47/22 |
| | | | | 370/230.1 |
| 2016/0044531 | A1* | 2/2016 | Papa | H04W 28/0289 |
| | | | | 370/230 |

(Continued)

*Primary Examiner* — Michael W Chao
*Assistant Examiner* — Peiliang Pan
(74) *Attorney, Agent, or Firm* — Norton Rose Fulbright US LLP; Gerard Messina

(57) ABSTRACT

A computer-implemented method for managing a memory in a network to which a unit for detecting or preventing undesirable network intrusions is assigned. A first message is received by a user of the network in the process. If the first message is to be stored, a second message is randomly selected from the messages stored in the memory, the randomly selected second message is deleted from the memory, and the first message is stored in the memory.

15 Claims, 1 Drawing Sheet

(56) References Cited

U.S. PATENT DOCUMENTS

| | | | | |
|---|---|---|---|---|
| 2016/0269305 A1* | 9/2016 | Sreeramoju | ............. | H04L 47/32 |
| 2017/0359365 A1* | 12/2017 | van den Berg | ......... | H04L 63/20 |
| 2019/0379683 A1* | 12/2019 | Overby | ............... | H04L 63/1408 |
| 2020/0059827 A1* | 2/2020 | Arvidson | ................ | H04L 47/32 |
| 2020/0186564 A1* | 6/2020 | Lothspeich | ......... | H04L 63/1441 |

\* cited by examiner

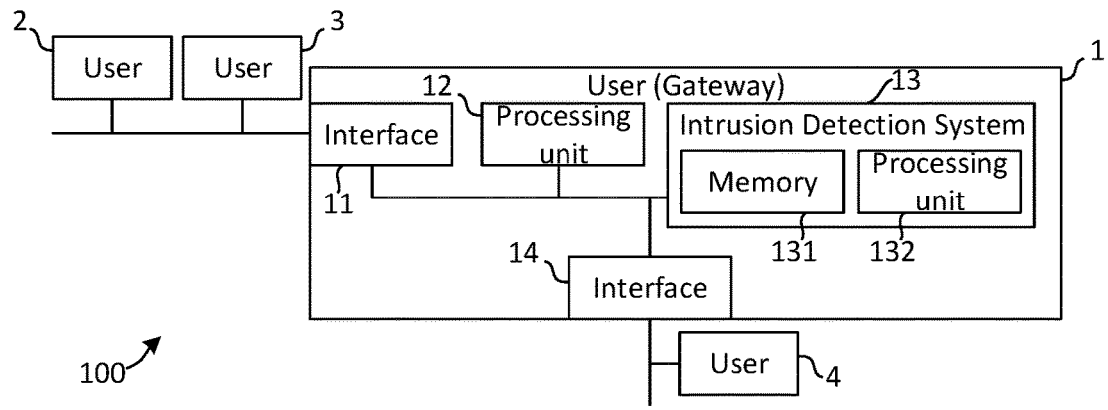
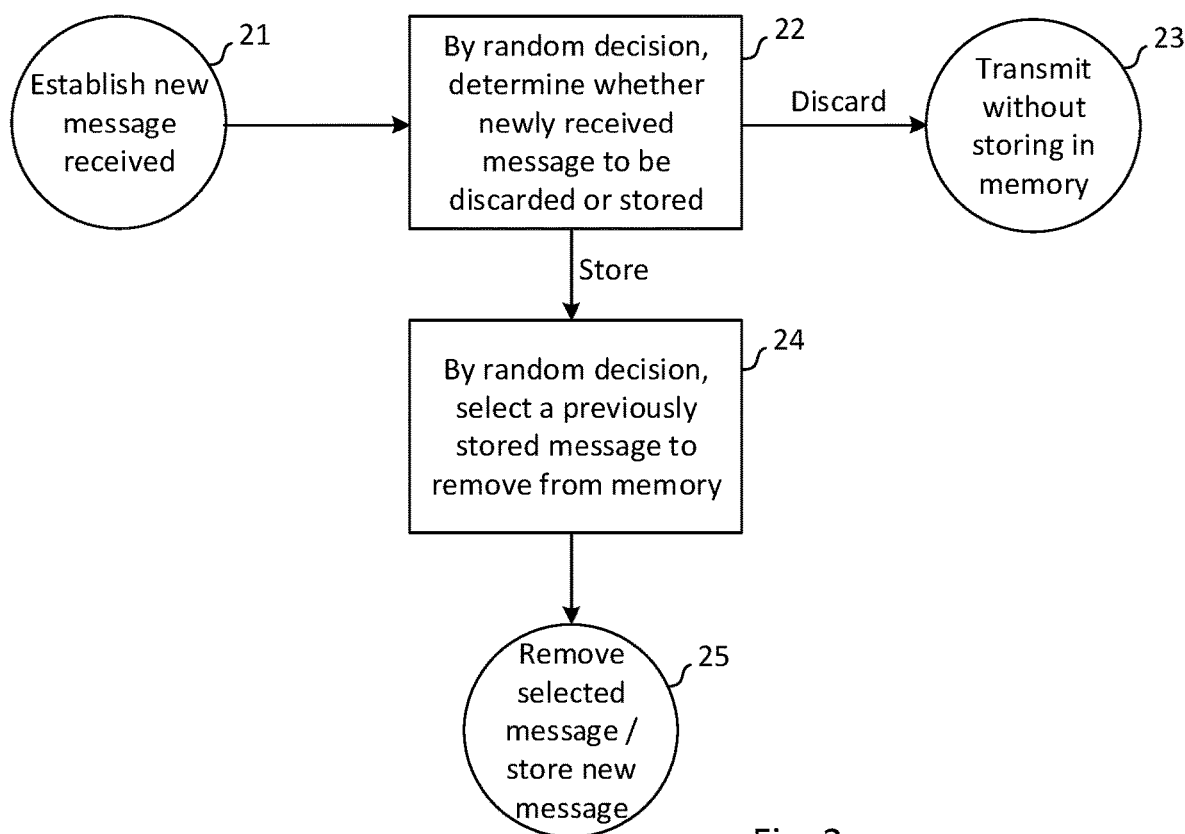

METHOD FOR MANAGING A MEMORY

RELATED APPLICATION INFORMATION

The present application claims priority to and the benefit of German patent application no. DE 10 2018 221 349.6, which was filed in Germany on Dec. 10, 2018, the disclosure of which is incorporated herein by reference.

FIELD OF THE INVENTION

The present invention relates to a method for managing a memory and to a computer program configured therefor.

BACKGROUND INFORMATION

A network-based intrusion detection system for use in a vehicle is discussed in not previously published patent DE 10 2018 215 945 A1.

SUMMARY OF THE INVENTION

A computer-implemented method for managing a memory in a network is provided, to which a unit for detecting or preventing undesirable network intrusions is assigned.

The network may be wired or wireless, for example an Ethernet network, a CAN or CAN FD bus, a WLAN or a Bluetooth network. In particular, it is a processor network, in particular a communication and/or control network, of a vehicle. The unit for detecting or preventing undesirable network intrusions may, in particular, be an intrusion detection system (IDS), an intrusion detection and prevention system (IDPS) or a firewall.

A memory management process is now provided, which is characterized by the steps:
  randomly selecting a second message from messages stored in the memory if a first message received by a user of the network is to be stored in the memory;
  deleting the randomly selected second message from the memory; and
  storing the first message in the memory.

The participant may be a network user including network interfaces, a storage arrangement/apparatus and at least one processing unit, for example also a gateway of a network. In a vehicle network it may also be a control unit, a central control unit or an on-board computer. The selection may take place by a processing unit, in particular by a processing unit of the user, after a corresponding computer program has been processed. A random generator or a pseudo random generator is used, in particular, to make the decision random.

Using such a method, an input load of a unit for detecting or preventing undesirable network intrusions may be reduced, in particular, to be able to handle limited processing and/or storage resources. The relief takes place in a manner which is not predictable for an attacker so that he or she is not able to take advantage of such a function for attacks.

In one advantageous embodiment, it is randomly decided upon receipt of the first message by the user of the network whether or not the first message is to be stored in the memory. Depending on the random decision, the storage takes place or does not take place in the memory.

This memory management function results in further relief of the memory of the security unit, again in such a way that it is not predictable for the attacker. Here as well, it is made more difficult to take advantage of the memory management properties for an attack.

The described methods may not only be used in an existing overload case of processing or storage capacity, but already if it is established that such an overload case is imminent, or also purely as a precaution.

In an advantageous embodiment, the described methods are used when an overload operation of the memory is established or is imminent, or when a drop below a particular free capacity occurs in the memory, in particular, when the particular free capacity is less than a maximum message size or less than a size of the first message.

The provided methods make it impossible for a potential attacker to predict which messages are processed or discarded by a security system when an overload case exists or is imminent. With this, they contribute to the security and robustness of such a system.

In advantageous embodiments of the described methods, the memory includes at least two memory blocks, in particular at least two memory blocks having a capacity sufficient for storing a maximum message size. In this way, further attack possibilities on the security system are reduced, thus making the system even more secure.

To keep the loss of information for the security unit by the provided methods low, in one embodiment meta data with respect to a received message are stored in the memory, in particular, a counter value of a message counter and/or a piece of information about a receive channel via which the message was received. This may be used by the security system for the detection or prevention of attempts to intrude into the network, and thereby make the system more effective. The system may be configured to be particularly robust when the counter value of the message counter is stored prior to shutting down the network or the user of the network, and is incremented further, starting from the stored counter value, after booting. As an alternative, the counter value may randomly be initially determined for the same purpose during a booting of the network or of the user of the network.

The described methods for memory management in the network may be implemented in hardware circuitry, in software or by hardware circuitry and software combined. In particular, a computer program may be configured to carry out such methods. For this purpose, such a computer program is stored in a machine-readable memory in the network, in particular, in a memory of the receiving network user, and is processed by a processing unit in the network, in particular, by a processing unit of the network user.

The present invention is described in greater detail hereafter with reference to the accompanying drawing and based on exemplary embodiments.

BRIEF DESCRIPTION OF THE DRAWINGS

FIG. 1 schematically shows an exemplary network.
FIG. 2 schematically shows an exemplary method for managing a memory.

DETAILED DESCRIPTION

Network-based IDS may be used in IT security to monitor the data traffic of a system and check it for known attacks. IDS denotes intrusion detection system and refers to a system having security functions which focus on the identification of intruding attacks on an IT system, for example on a processor network of a vehicle. Whereas a firewall, for example, is to prevent an undesirable intrusion into a system, it is (initially) sufficient for an IDS to identify, for example by subjecting a system behavior to a plausibility check, that such an intrusion is taking place or has taken place. Suitable reactions to this may then be initiated, e.g., also in a combined intrusion detection and prevention system (IDPS).

In contrast to a firewall, the messages do not have to be processed in real time in a network-based IDS. Rather, copies of the messages may be created. The original message may be delivered to the recipient without further delay. The copy of the original message is buffered for the time being to wait for a favorable operating point in time for further processing by the IDS (for example, low utilization of the processing resource). For example, for an Ethernet-based communication, the original message may be received by the switch, a copy may be created by processing using a TCAM rule, and this copy may be forwarded to a processing unit of an IDS in the switch-internal microcontroller.

FIG. 1 shows a network 100 including network users 1, 2, 3, 4 and network links 101 and 102. The network may be wired or wireless. In particular, it is a processor or communication and/or control network of a vehicle. The network may, for example, be an Ethernet network, a CAN or CAN FD bus, a Bluetooth network or a WLAN.

Network user 1 includes an IDS 13 here. For example, network user 1 may be a gateway of network 100. Network user 1 may now receive a message via communication link 101, for example from network user 2 or 3. This message may be received via an interface 11 of network user 1, which, in particular, also includes a buffer memory. A processing unit 12 of network user 1 may control or configure the message reception, the message processing, the management of storage resources and the message dispatch. Messages may be sent via an interface 14 of network user 1, for example, received messages may be forwarded. Interface 14, in particular, also includes a buffer memory. Messages may be sent via communication link 102, for example to network user 4.

IDS 13 of network user 1 includes a memory 131 and, if necessary, a processing unit 132. Received messages may be buffered in memory 131, which may be checked by IDS 13, in particular processing unit 132, for indications of an intrusion process into the network.

Due to the possible chronological decoupling between the receipt of a message by network user 1 and the IDS check of the message, the received messages may be buffered in memory 131 for the time being, where they await further processing. As a result of resource limitations, it is generally not possible to provide so much storage for memory 131 that free storage capacities are guaranteed for every scenario. In an overload scenario, IDS 13 thus runs the risk that no storage capacity for the storage of additional messages exists any longer in memory 131—messages thus have to be discarded.

If conventional queue management mechanisms, such as leaky bucket, are now used for managing the buffer, IDS 13 thus becomes attackable. This is due to the fact that such queue mechanisms in general show a predictable behavior. This characteristic may be taken advantage of by a potential attacker by intentionally driving IDS 13 into an overload scenario. As a consequence, IDS 13 is no longer able to consider any new messages and thus is no longer able to identify any new attacks. During such phases, the attacker then has the chance to carry out the actual attack without being noticed by IDS 13.

Thus, a random-controlled handling of the processing and storage of newly received messages is provided for a system for detecting or preventing an intruding attack into a network, in particular in the overload scenario.

FIG. 2 schematically shows an exemplary sequence for managing a memory.

In a first step 21, it is established by a network user that a new message has been received which is to be stored in a memory of the network user, and the method is started. In step 21, it may additionally be provided that the method is only carried out or continued if a free capacity of the memory drops below a particular threshold, in particular, drops below a maximum message size or the size of the newly received message.

In a second step 22, it is decided by chance for a newly arriving message, in particular through the use of a random generator, whether it is to be stored in a memory to thereupon be able to be checked by the system for detecting or preventing an intruding attack on the network, or whether it is to be discarded. The discarding refers, in particular, only to the purposes of the security system. In particular, in the above-described scenario, upon being received in a buffer memory of the network user, the message may also be forwarded by this network user or be processed otherwise.

If it is decided in step 22 that the message is being discarded, the method branches to step 23. No storage in the memory of the network user for the purpose of a security analysis takes place, and the method is terminated. The message may nonetheless be processed otherwise or be forwarded by the network user.

If it is decided in step 22 that the message is to be stored in the memory, the method branches to step 24. If the method is only carried out if the free storage capacity of the memory drops below a particular threshold or if a corresponding drop is established in a check in step 24, it is decided, again randomly, in step 24 which message already stored in the memory is to be deleted therefrom, so that the new message may be stored accordingly.

The memory requirement of the new message is to be taken accordingly into consideration in the process. The freed-up memory has to correspond at least to the memory requirement of the new message.

Since new attack possibilities may arise therefrom, it is provided that the memory may include at least two blocks, which are able to store a maximum message size.

In a final step 25, the randomly selected message is now deleted from the memory, and the newly received message is stored in the memory.

The described methods may advantageously be used not only for memories assigned to IDS, but, for example, also for memories assigned to IDPS or firewalls.

The described methods may result in the disadvantage that reception sequences which were previously implicitly defined by the memory management become lost by the random control. In the overload case, however, this is the case anyhow since messages have to be discarded. To nonetheless render corresponding pieces of information visible and, in particular, be able to evaluate them for security purposes by the security system, it is provided that the messages in the memory are enriched with meta data.

Possible meta data are, for example, the value of a counter of the incoming messages, in particular per receive channel, and a piece of information about the respective receive channel via which the message was received. To avoid attack possibilities arising therefrom, it is now provided that a corresponding counter stores the old counter value when the system is being shut down, and increments further, starting from the old value, after the system has been booted, or that, during booting, the die is rolled for a value in a random-controlled manner, from which the counter counts for this operating cycle. The value range of the counter or the random rolling of the die for the starting value may be selected or limited in such a way that replay attacks due to an overflow are avoided.

What is claimed is:

1. A computer-implemented method for managing a memory in a network, the method comprising:
   receiving a plurality of messages by a first user station of the network, the first user station including the memory, a processor, and a transmission interface;
   for each message of a first subset of the plurality of messages, the processor of the first user station (1) transmitting the respective message to a respective one of second user stations over the network via the transmission interface, (2) by a respective random selection, selecting the respective message for storage in the memory, and (3) based on the respective random selection, storing the respective message in the memory;
   for each message of a second subset of the plurality of messages, the processor of the first user station (1) by a respective random selection, selecting the respective message to be transmitted without being stored in the memory, and (2) based on the respective random selection performed for the respective message, transmitting the respective message to a respective one of the second user stations over the network via the transmission interface without the respective message being stored in the memory; and
   the processor processing the memory by sequentially analyzing those of the messages that have been stored in the memory without being deleted prior to the analysis of the respective messages to detect an information attack with respect to the respective analyzed messages, such that the analysis (1) is performed for none of the second subset of the messages and (2) is performed for one or more of the first subset of the plurality of messages only after the transmission of the one or more of the first subset of the plurality of messages;
   wherein, for each newly received one of one or more of the first subset of the plurality of messages, the storing of the respective message includes:
      randomly selecting an other one of the first subset of the plurality of messages that has previously been stored in the memory;
      deleting the randomly selected other one of the first subset of the plurality of messages from the memory so that the analysis is not performed for the deleted randomly selected other one of the first subset of the plurality of messages; and
      storing the newly received one of the first subset of the plurality of messages in the memory.

2. The method of claim 1, wherein the respective random selection selecting the respective message to be transmitted without being stored in the memory is performed in response to an overload of the memory being established or being determined to be imminent, or when a drop below a particular free capacity occurs in the memory.

3. The method of claim 2, wherein the particular free capacity is less than a size of the respective message.

4. The method of claim 1, wherein the respective random selection selecting the respective message to be transmitted without being stored in the memory is performed in response to a determination that a free capacity of the memory is less than a maximum message size even though a size of the respective message is less than the maximum message size.

5. The method of claim 4, wherein at least two of the at least two memory blocks have a capacity sufficient for storing a maximum message size.

6. The method of claim 1, wherein the memory includes at least two memory blocks.

7. The method of claim 1, wherein, for each of the first subset of the plurality of messages, meta data with respect to the respective message are stored in the memory, the meta data being a respective counter value of a message counter and/or a piece of information about a receive channel via which the respective message was received.

8. The method of claim 7, wherein the counter value is stored prior to shutting down the network or the user of the network and is incremented further, starting from the stored counter value, after booting.

9. The method of claim 1, further comprising:
   during a booting of the network or of the first user station of the network, setting a counter value of a message counter to a randomly selected initial value; and
   for each of one or more of the first subset of the plurality of messages, incrementing the message counter to a respective new counter value and storing the respective new counter value in association with the respective message.

10. The method of claim 1, wherein the network is an Ethernet network, a CAN or CAN FD bus, a WLAN or a Bluetooth network.

11. The method of claim 1, wherein the network is a processor network of a vehicle.

12. The method of claim 1, wherein sequential analysis is a function of an intrusion detection system (IDS), an intrusion detection and prevention system (IDPS), or a firewall.

13. The method of claim 1, wherein the network is a a communication and/or control network of a vehicle.

14. A non-transitory computer readable medium on which are stored instructions that are executable by a processor of a first user station of a network and that, when executed by the processor, causes the processor to perform a method for managing a memory in the network, the first user station including the memory, the processor, and a transmission interface, and the method comprising:
   receiving a plurality of messages by the first user station of the network;
   for each message of a first subset of the plurality of messages, the processor of the first user station (1) transmitting the respective message to a respective one of second user stations over the network via the transmission interface, (2) by a respective random selection, selecting the respective message for storage in the memory, and (3) based on the respective random selection, storing the respective message in the memory;
   for each message of a second subset of the plurality of messages, the processor of the first user station (1) by a respective random selection, selecting the respective message to be transmitted without being stored in the memory, and (2) based on the respective random selection performed for the respective message, transmitting the respective message to a respective one of the second user stations over the network via the transmission interface without the respective message being stored in the memory; and
   the processor processing the memory by sequentially analyzing those of the messages that have been stored in the memory without being deleted prior to the analysis of the respective messages to detect an information attack with respect to the respective analyzed messages, such that the analysis (1) is performed for none of the second subset of the messages and (2) is performed for one or more of the first subset of the plurality of messages only after the transmission of the one or more of the first subset of the plurality of messages;

wherein, for each newly received one of one or more of the first subset of the plurality of messages, the storing of the respective message includes:

randomly selecting an other one of the first subset of the plurality of messages that has previously been stored in the memory;

deleting the randomly selected other one of the first subset of the plurality of messages from the memory so that the analysis is not performed for the deleted randomly selected other one of the first subset of the plurality of messages; and storing the newly received one of the first subset of the plurality of messages in the memory.

15. A first user station of a network, the first user station comprising:

a processor;

a memory;

a transmission interface; and a non-transitory computer readable medium on which are stored instructions that are executable by the processor and that, when executed by the processor, cause the processor to perform a method for managing the memory, the method comprising:

receiving a plurality of messages by the first user station of the network;

for each message of a first subset of the plurality of messages, the processor of the first user station (1) transmitting the respective message to a respective one of second user stations over the network via the transmission interface, (2) by a respective random selection, selecting the respective message for storage in the memory, and (3) based on the respective random selection, storing the respective message in the memory;

for each message of a second subset of the plurality of messages, the processor of the first user station (1) by a respective random selection, selecting the respective message to be transmitted without being stored in the memory, and (2) based on the respective random selection performed for the respective message, transmitting the respective message to a respective one of the second user stations over the network via the transmission interface without the respective message being stored in the memory; and the processor processing the memory by sequentially analyzing those of the messages that have been stored in the memory without being deleted prior to the analysis of the respective messages to detect an information attack with respect to the respective analyzed messages, such that the analysis (1) is performed for none of the second subset of the messages and (2) is performed for one or more of the first subset of the plurality of messages only after the transmission of the one or more of the first subset of the plurality of messages;

wherein, for each newly received one of one or more of the first subset of the plurality of messages, the storing of the respective message includes:

randomly selecting an other one of the first subset of the plurality of messages that has previously been stored in the memory;

deleting the randomly selected other one of the first subset of the plurality of messages from the memory so that the analysis is not performed for the deleted randomly selected other one of the first subset of the plurality of messages; and storing the newly received one of the first subset of the plurality of messages in the memory.

* * * * *